United States Patent [19]

Lohr, Jr. et al.

[11] 3,892,693

[45] July 1, 1975

[54] HIGH TEMPERATURE STABILIZED POLYBUTADIENE RESIN

[75] Inventors: Delmar F. Lohr, Jr.; Edward L. Kay, both of Akron, Ohio

[73] Assignee: The Firestone Tire & Rubber Company, Akron, Ohio

[22] Filed: Mar. 20, 1974

[21] Appl. No.: 452,775

[52] U.S. Cl.... 260/23.7 R; 260/23.7 M; 260/42.18; 260/42.37; 260/45.75 C
[51] Int. Cl........................ C08c 11/72; C18d 9/14
[58] Field of Search .. 260/23.7 R, 23.7 M, 45.75 C, 260/783, 79.5

[56] References Cited
UNITED STATES PATENTS

| | | | |
|---|---|---|---|
| 1,867,631 | 7/1932 | Romieux | 260/783 |
| 3,083,175 | 3/1963 | Safford | 260/45.5 |
| 3,308,103 | 3/1967 | Coran | 260/79.5 |
| 3,703,491 | 11/1972 | Takayama | 260/23.7 R |
| 3,786,009 | 1/1974 | Lohr | 260/23.7 M |

Primary Examiner—Donald E. Czaja
Assistant Examiner—William E. Parker

[57] ABSTRACT

The incorporation of esters of 0,0-dihydrocarbylphosphorodithioic acids with metal soaps into a high vinyl polybutadiene polymer or polybutadiene-styrene copolymer when cured with a peroxide imparts favorable high heat stability.

36 Claims, No Drawings

HIGH TEMPERATURE STABILIZED POLYBUTADIENE RESIN

BACKGROUND OF THE INVENTION

The present invention relates to high heat stability of polybutadiene polymers and polybutadiene-styrene copolymers and more particularly to high flexural strength properties and high flexural strength retention upon prolonged exposure to heat and air when stabilized with esters of O,O-dihydrocarbylphosphorodithioic acids.

Heretofore, butadiene polymers and butadiene-styrene copolymers having a high vinyl (1,2-configuration) content in an uncured state are generally useful when cured as electrical insulating components, friction elements, and the like. Additionally, such polymers and copolymers exhibit good mechanical properties. However, these resins tend to degrade over a period of time upon exposure to high temperatures such as above 350°F and are thus unsuitable for high temperature exposure for any length of time.

Our prior patent, U.S. Pat. No. 3,786,009, granted Jan. 15, 1974, generally improved the properties of resins against high temperature degradation. However, in many applications, even higher heat stability is desired along with an increase in flexural strength and flexural strength retention upon aging.

SUMMARY OF THE INVENTION

Accordingly, it is an object of the present invention to provide polybutadiene polymer and polybutadiene-styrene copolymer resins which have improved high heat resistant properties.

It is another object of the present invention to provide resins, as above, which are stabilized against thermal oxidation effects by esters of O,O-dihydrocarbylphosphorodithioic acids.

It is a further object of the present invention to provide resins, as above, which upon exposure to heat and air for extended periods of time have high flexural strength retention and improved flexural strength properties.

It is yet another object of the present invention to improve the heat resistance of such resins by incorporating modest amounts of heat stabilizing agents and other compounds which are readily available, inexpensive and which are safe to use in that they are not toxic, corrosive or the like.

In general, a high heat-stablized resin comprises by weight 100 parts of a polybutadiene polymer or polybutadiene-styrene copolymer containing at least 40% of butadiene, wherein at least 80% of said butadiene repeating units in the polymer or copolymer having a 1,2-configuration, from 0.5 to about 5.0 parts of a metal soap wherein the metal is selected from the class of calcium, magnesium, zinc, and cadmium and said soap is a fatty acid having from 8 to about 26 carbon atoms, from 0.5 to about 6.0 parts of a peroxide curing agent giving radicals having a formula $R_2(CH_3)CO$. wherein R is a hydrocarbon radical of 1 to about 20 carbon atoms, and from 0.5 to about 5.0 parts of an ester of O,O-dihydrocarbylphosphorodithioic acid.

DESCRIPTION OF THE PREFERRED EMBODIMENTS

According to the concepts of the present invention, resins which may be heat stabilized against thermoxidative effects are polymers of butadiene or copolymers of butadiene-styrene containing at least 40% by weight of butadiene. Such resins may also include up to 15% by weight of other ethylenically unsaturated compounds which are incorporated in the copolymers. The resins of the present invention may contain conventional fillers, reinforcing fibers and fabrics such as glass fiber, glass fabric, asbestos and the like, pigments, flame retardants, curing agents such as peroxides and metal soaps.

Generally, the molecular weight of the polybutadiene resins or polybutadiene-styrene resins may range from about 1,000 to about 200,000 with an average molecular weight (determined by intrinsic viscosity measurement) ranging from about 12,500 to about 55,000. Desirably, at least 50% of the polymers and preferably 90% have a molecular weight above 10,000 with at least 95% having a molecular weight above 2,000. The presence of higher proportions of polymers having molecular weights below these limitations generally cause slow curing rates and have poor physical properties in the cured product. On the other hand, an average molecular weight of greater than 55,000, that is an intrinsic viscosity of about 0.7 at 25°C or about 0.68 at 30°C, does not result in good processability and good flow during molding. A desirable intrinsic viscosity range is from about 0.2 to about 0.7 and preferably from about 0.3 to about 0.6. The resins according to the present invention may be prepared by utilizing free radical or anionic catalysts. Additionally, the polybutadiene portion of the resins has a vinyl content of at least 80% by weight and preferably 90%. That is, the butadiene units are incorporated into the polymeric chain largely in the 1,2-configuration.

Various ingredients may be added to the resins as above-noted such as fillers, reinforcing agents, and the like. A preferred filler is silica which may be incorporated to the extent of from 100 to about 500 parts by weight per 100 parts of resin. A preferred range is from 200 to about 400 parts with a range of 350 to about 390 being highly preferred. Additionally, other desirable fillers include glass fiber either as a chop filler or as a glass fabric in a laminate in which case the glass fiber serves the purpose of a filler and prevents crazing and cracking during fast cures. However, fillers generally tend to produce a stiff resin when cured and therefore in applications wherein flexible properties are desirable such as in electric wiring, fillers are not used.

The various fillers, reinforcing agents, compounding ingredients and the like are then mixed in a container. Solvents such as hexane, heptane, and toluene may be utilized and the resulting slurry stirred until the various compounds are blended. However, the use of solvents is not necessary and in fact is usually only a laboratory expedient since the various compounds can be adequately dry blended in container. Moreover, in actual production dry blending is preferred since it eliminates the need for solvents as well as the removal of the solvent, usually by vacuum.

The metal soaps used in the present invention may be metallic salts of a higher fatty acid containing from 8 to about 26 carbon atoms wherein the preferred metals are calcium, magnesium, zinc, and cadmium. Generally, the metal may be selected from group 2A or 2B of the periodic table (Handbook of Chemistry and Physics, 46th Edition, the Chemical Rubber Company, 1965–1966, Page B–3). Examples of desirable metallic soaps include calcium 2-ethyl-hexanoate, calcium octoate, calcium laurate, calcium myristate, calcium stearate, calcium palmitate, calcium oleate, calcium arachidate, magnesium stearate, magnesium octotate, magnesium oleate, zinc stearate, zinc oleate, zinc laurate, cadmium stearate and mixtures thereof in any proportions. A preferred metallic soap is calcium stearate. A desirable amount of the metallic soaps by weight for 100 parts of resin is from 0.5 to about 5.0 parts with 2.0 to 4.0 parts being a preferred range. Generally it is thought that metallic salts have a stabilizing effect on the flexural strength of the resins.

The polymers and the various ingredients including the high heat stabilizers set forth hereinbelow are cured generally by utilizing a peroxide giving radicals of the structure $R_2(CH_3)CO.$, wherein R is a hydrocarbon radical of 1 to about 20 carbon atoms and the two hydrocarbon radicals need not be the same. Specific examples include dicumyl peroxide, a preferred peroxide, ditertiary butyl peroxide, tertiarybutyl-cumyl peroxide, ditertiaryamyl peroxide, tertiaryamyl-cumyl peroxide and the like. The amount of such class of peroxides ranges from 0.5 to about 6 parts by weight per 100 parts of polymer and preferably from 1.5 to about 3.0 parts. The composition including the various ingredients is cured by heating, generally under pressure, to produce the desired finished article. The heating or molding temperature is not critical and may range from about 250° to about 420°F with a preferred range being from about 300° to about 350°F. It has been found that generally no advantage in the product or process is obtained by exceeding a temperature of 420°F. The amount of time required may generally vary from a very short time such as a matter of seconds to a matter of several hours. However, cure times of usually more than a matter of a few minutes usually provide no added advantage. Of course, generally the higher the temperature the shorter the cure time required. Moreover, if fast cures are desired, a filler is generally necessary to avoid crazing or cracking.

The heat stabilizing compounds which give greatly improved results against thermooxidative effects may be illustrated by the following generalized formula:

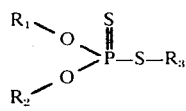

$R_1$ and $R_2$ are hydrocarbyl radicals containing from 1 to about 25 carbon atoms which may be the same of different. More specifically, $R_1$ and $R_2$ may be simple aliphatic hydrocarbon radicals such as ethyl, n-propyl, isopropyl, n-butyl, isobutyl, t-butyl, n-hexyl, 2-ethylhexyl, n-dodecyl, the mixed radicals derived from petroleum fractions or the reduction of natural fatty glycerides such as coconut oil or tallow, cyloaliphatic radicals such as cyclohexyl, methylcyclohexyl, the reduction products of naval stores, aromatic radicals such as phenyl, o-, p- and m- toluyl, naphthyl and aralkyl radicals such as benzyl, phenylethyl and the like.

$R_3$ is also a hydrocarbyl group containing from 1 to 25 carbon atoms with the carbon atom which is directly bonded to the sulfur atom being an activated methylene group. Specific $R_3$ hydrocarbyl radicals include allyl, methallyl, 2-butenyl, 2-3-dimethyallyl, 3-phenylallyl, 3-cyclohexylallyl, benzyl, o,m, or p-chlorobenzyl, o,m, or p-bromobenzyl, o,m or p-methylbenzyl, o,m or p-bromophenacyl, o,m or p-methylphenacyl and the like. Highly preferred $R_3$ hydrocarbyl radicals for the present invention are phenacyl and o,m or p-chlorophenacyl with the $R_1$ and $R_2$ groups both being ethoxy. In general, the $R_3$ groups which are preferred include allyl, benzyl, phenacyl, and substituted allyl, benzyl and phenacyl radicals. Although stabilizers containing aliphatic $R_3$ groups tend to be more stable than aromatic $R_3$ groups, selection is often dependent upon desired results and availability of compounds.

In essence, compounds of the above formulation can be characterized as esters of O,O-dihydrocarbylphosphorodithioic acids. Such high heat stabilizers may be used in an amount from 0.5 to about 5.0 parts by weight per 100 parts of resin with a preferred range being from 0.9 to about 3.5 parts.

High heat stabilizers of the present invention as set forth in the above formula may be prepared as summarized by the following equation wherein $R_1$, $R_2$ and $R_3$ are hydrocarbyl radicals as set forth above and wherein M denotes a metal ion such as $Na^+$, $K^+$ or an alkaline earth cation such as $Ca^{++}$ or $Mg^{++}$ in which case the

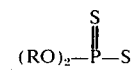

moiety will be doubled to satisfy the double charge on the alkaline earth cation.

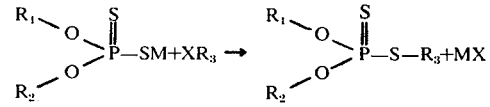

The above formula follows conventional chemical notation and "X" denotes a halogen atom such as chlorine or bromine. $R_3$ hydrocarbyl groups which contain a chlorine atom as the halogen are preferred since generally they are readily available and inexpensive. However, when the halogen is bromine, the above chemical reaction will more readily take place since bromine tends to be more reactive.

The above chemical reaction is preferably carried out in a solvent in which the dithioate ester is soluble and the metal salt coproduct (MX) is insoluble so that the dithioate ester may be readily recovered by removal of the MX salt as by filtration and then removing the solvent from the dithioate ester as by distilling.

A specific example of the preparation of the dithioate ester (O,O-diethyl-S-benzylphosphorodithioate) is as follows. Alpha-chlorotoluene (6.3g,0.05 mole) in 50 ml of 1,2-dimethoxyethane (or other suitable solvent, such as, tetrahydrofuran) was added dropwise at room temperature to a slurry of 11.2 g(0.05 mole) of potassium O,O-diethylphosphorodithioate in 200 ml 1,2-dimethoxyethane. When the addition was complete, the reaction mixture was filtered to remove potassium chloride. After removal of the solvent on a rotary evaporator there remained 11.3 g(82%) of an almost colorless oil. The mass spectrum and infrared spectrum confirmed that the desired product was obtained.

The cured resins produced in accordance with the present invention with the dithioate esters have been found to have unexpectedly high flexural strengths both before and more importantly, after aging. In general, the flexural strengths before aging are generally in excess of 11,000 psi and some in excess of 12,000 psi whereas after aging, the flexural strengths are generally in excess of 10,000 pounds with the highly preferred stabilizers having flexural strengths of about 12,000 psi. Moreover, the percent of the flexural strength retention after aging is generally in excess of 80% and with respect to the highly desired stabilizers, in excess of 100%. Generally, flexural strength retention above 50% is suitable with 80% and above being desirable. Considering the flexural modulus, the aged properties show unexpectedly high values, generally about $1.2 \times 10^6$ PSI and higher with the highly preferred stabilizers of the present invention having values of about $1.40 \times 10^6$ PSI and higher. Additionally, the percent of retention of the flexural modulus after aging is generally in excess of 95% with the highly preferred stabilizers being in excess of 110%. These high property values, especially of the highly preferred stabilizers were completely unexpected in that the present stabilizers are structurally different than prior known heat stabilizing compounds.

The resins in the present invention can therefore be used in many situations wherein heat exposure is a factor as in cooking utensil handles, automobile engine components, structural electrical components, potting compounds for electrical components and as electrical insulators when a filler is not utilized.

The present invention will be more readily understood by the following examples wherein all parts and percentages are given on a weight basis unless otherwise stated.

EXAMPLE I

|  | Parts by Weight |
| --- | --- |
| Polybutadiene (80% vinyl) | 100 |
| Silica | 380 |
| Vinyl triacetoxysilane | 3 |
| Dicumyl peroxide | 3 |
| Hexane | 150 |
| Calcium Stearate | 3.0 |
| Dithioate ester | 2.0 – 3.0 |

These series of compositions were made up in accordance with the above proceeding formulation wherein the amount of the dithioate ester was varied as set forth in Table I, hereinbelow. The various ingredients including from 0.3 to about 10.0 parts of a vinyl silane in the above composition or 0.007 to 0.026 parts of vinyl silane per one part of silica, were thoroughly mixed and mixture poured into a container to a depth of about 0.5 inch and the hexane removed under a reduced pressure of from 1 to about 5mm of Hg at 120°F. The material was then molded under 10 to 20 tons of pressure at 350°F into test bars of 1 inch × 3 inches × 0.1. inch. The molding time is not critical and may vary from a matter of several seconds to several hours. Likewise the molding temperature is not critical and may vary from 250° to about 420°. The test bars were aged for 100 hours in the presence of forced air having a temperature of 600°F. After aging, the test bars were tested at ambient conditions on an Instrom Tester for flexural strength and flexural modulus. The results are set forth in Table I.

TABLE I

STABILIZING EFFECTS OF O,O-DIHYDROCARBYLPHOSPHORODITHIOATE ESTERS

| Sample No. | Parts of Stabilizer per 100 parts of Resin | Flexural Modulus PSI × 10⁻⁶ | | | Flexural Strength PSI | | |
| --- | --- | --- | --- | --- | --- | --- | --- |
| | | Initial | Aged | % Retained | Initial | Aged | % Retained |
| 1. (Control) | — | 1.40 | 1.11 | 79 | 10700 | 7200 | 67 |
| 2. | A;2.0 | 1.19 | 1.17 | 98 | 11800 | 9700 | 82 |
| 3. | B;2.0 | 1.23 | 1.40 | 114 | 11400 | 11800 | 104 |
| 4. | C;2.0 | 1.30 | 1.56 | 120 | 11600 | 12100 | 104 |
| 5. | D;1.0 | 1.23 | 1.19 | 97 | 11200 | 8700 | 78 |
| 6. | D;2.0 | 1.36 | 1.30 | 96 | 11800 | 11200 | 95 |
| 7. | E;2.0 | 1.13 | 1.10 | 97 | 12800 | 10500 | 82 |
| 8. | E;3.0 | 1.05 | 1.16 | 110 | 12300 | 10700 | 87 |

STABILIZER IDENTIFICATION
A = O,O-diethyl-S-benzylphosphorodithioate
B = O,O-diethyl-S-phenacylphosphorodithioate
C = O,O-diethyl-S-p-chlorophenacylphosphorodithioate
D = O,O-diethyl-S-allylphosphorodithioate
E = O,O-di-n-hexyl-S-benzylphosphorodithioate As apparent from Table I, the cured resins according to the present invention contain very useful properties even after prolonged exposure to high temperature conditions. In fact, in some situations, exposure to high temperatures actually improved the properties. Although the reason for such increase upon heating is not understood, it is surmised that additional curing evidently occurred. The properties obtained with the high heat stabilizers of O,O-diethyl-S-phenacylphosphorodithioate and O,O-diethyl-S-p-chlorophenacylphosphorodithioate are particularly suitable for high temperature application and thus as noted above, highly preferred. The dithioate ester stabilizers of the present invention against thermooxidative effects have been explained in detail with respect to the preferred embodiments. As apparent to one skilled in the art, various modifications can be made according to the concepts of the present invention without departing from the spirit of the invention herein disclosed. While in accordance with the Patent Statutes, the preferred embodiments have been illustrated and described in detail, it is to be understood that the invention is not limited thereto; the scope of the invention being measured solely by the scope of the attached claims.

What is claimed is:

1. A cured heat-stabilized resin, comprising by weight, 100 parts of a resin selected from the class consisting of a homopolymer of butadiene or a copolymer of butadiene and styrene containing at least 40% of butadiene, at least 80% of the butadiene repeating units in the polymer or copolymer being in the 1,2-configuration, from 0.5 to about 5.0 parts of a metal soap wherein said metal is selected from the class consisting of calcium, zinc, magnesium, and cadmium and said soap is of a fatty acid having from 8 to about 26 carbon atoms, from 0.5 to about 6.0 parts of a peroxide curing agent giving radicals having the formula $R_2(CH_3)CO$. wherein R is a hydrocarbon radical of 1 to about 20 carbon atoms, and, from 0.5 to about 5.0 parts of an ester of O,O-dihydrocarbylphosphorodithioic acid having the formula

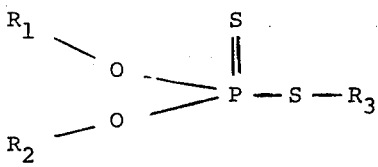

wherein $R_1$ and $R_2$ are hydrocarbyl groups having from 1 to about 25 carbon atoms and $R_3$ is a hydrocarbyl group containing from 1 to 25 carbon atoms.

2. A cured heat-stabilized resin according to claim 1, wherein the amount of said ester is more particularly 0.9 to about 3.5 parts and the amount of said soap more particularly is from 2.0 to about 4.0 parts.

3. A cured heat-stabilized resin according to claim 1, including a silica filler and a vinyl silane.

4. A cured heat-stabilized resin according to claim 1, wherein said soap is calcium stearate and said peroxide is dicumyl peroxide.

5. A cured heat-stabilized resin according to claim 1, where $R_1$ and $R_2$ of said ester compound are selected from the group consisting of aliphatic, cycloaliphatic, aromatic and aralkyl and $R_3$ of said ester compound is selected from the group consisting of allyl, benzyl, phenacyl, substituted allyl, substituted benzyl and substituted phenacyl.

6. A cured heat-stabilized resin according to claim 5, wherein said ester is selected from the class consisting of O,O-diethyl-S-phenacylphosphorodithioate and O,O-diethyl-S-o, m or p-chlorophenacylphosphorodithioate.

7. A process for producing heat-stabilized resins, comprising the steps of, subjecting to a curing temperature a composition containing by weight, 100 parts of a polymer selected from the class consisting of a homopolymer of butadiene or a copolymer of butadiene and styrene containing at least 40% of butadiene, at least 80% of the butadiene repeating units in the polymer or copolymer being in the 1,2-configuration, from 0.5 to about 5.0 parts of a metal soap wherein said metal is selected from the class consisting of calcium, zinc, magnesium, and cadmium and said soap is of a fatty acid having from 8 to about 26 carbon atoms, from 0.5 to about 6.0 parts of a peroxide curing agent giving radicals having the formula $R_2(CH_3)CO$. wherein R is a hydrocarbon radical of 1 to about 20 carbon atoms, and, from 0.5 to about 5.0 parts of an ester of O,O-dihydrocarbylphosphorodithioic acid having the formula

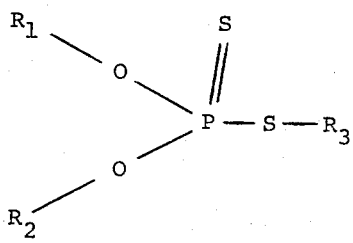

where $R_1$ and $R_2$ are hydrocarbyl groups having from 1 to about 25 carbon atoms and $R_3$ is a hydrocarbyl group containing from 1 to 25 carbon atoms.

8. A process according to claim 7, wherein the amount of said esters more particularly from 0.9 to about 3.5 parts and the amount of said soap more particularly is from 2.0 to about 4.0 parts.

9. A process according to claim 7, including the additional step of adding a silica filler and a vinyl silane.

10. A process according to claim 7, wherein said soap is calcium stearate and said peroxide is dicumyl peroxide.

11. A process according to claim 7, where $R_1$ and $R_2$ of said ester compound is selected from the group consisting of aliphatic, cycloaliphatic, aromatic and aralkyl and $R_3$ is selected from the class consisting of allyl, benzyl, phenacyl, substituted allyl, substituted benzyl and substituted phenacyl.

12. A process according to claim 11, wherein said ester is selected from the class of O,O-diethyl-S-phenacylphosphorodithioate and O,O-diethyl-S-o, m or p-chlorophenacylphosphorodithioate.

13. A composition curable to a heat-stabilized resin comprising by weight 100 parts of a polymer selected from the class of a homopolymer of butadiene or a copolymer of butadiene and styrene containing at least 40% of butadiene, at least 80% of the butadiene repeating units in the polymer or copolymer being in the 1,2-configuration, from 0.5 to about 5.0 parts of a metal soap wherein said metal is selected from the class consisting of calcium, zinc, magnesium, and cadmium and said soap is of a fatty acid having from 8 to about 26 carbon atoms, from 0.5 to about 6.0 parts of a peroxide curing agent giving radicals having the formula $R_2(CH_3)CO$. wherein R is a hydrocarbon radical of 1 to about 20 carbon atoms, and, from 0.5 to about 5.0 parts of an ester of O,O-dihydrocarbylphosphorodithioic acid having the formula

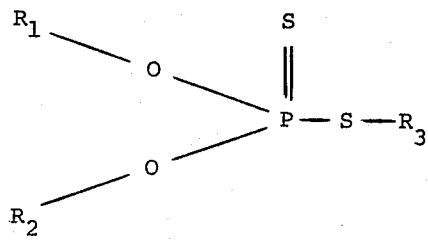

where $R_1$ and $R_2$ are hydrocarbyl groups having from 1 to about 25 carbon atoms and $R_3$ is a hydrocarbyl group containing from 1 to 25 carbon atoms.

14. A composition according to claim 13, wherein the amount of said ester is more particularly 0.9 to about 3.5 parts and the amount of said soap more particularly is from 2.0 to about 4.0 parts.

15. A composition according to claim 13, including a silica filler and a vinyl silane.

16. A composition according to claim 13, wherein said soap is calcium stearate and said peroxide is dicumyl peroxide.

17. A composition according to claim 13, where said $R_1$ and $R_2$ of said ester compound are selected from the group consisting of aliphatic, cycloaliphatic, aromatic, and aralkyl and $R_3$ is selected from the class consisting of allyl, benzyl, phenacyl, substituted allyl, substituted benzyl and substituted phenacyl.

18. A composition according to claim 17, wherein said ester is selected from the class consisting of O,O-diethyl-S-phenacylphosphorodithioate and O,O-diethyl-S-o, m or p-chlorophenacylphosphorodithioate.

19. A cured heat-stabilized resin according to claim 5, wherein said ester compound is selected from the class consisting of O,O-diethyl-S-benzylphosphorodithioate, O,O-diethyl-S-allylphosphorodithioate and O,O-di-n-hexyl-S-benzylphosphorodithioate.

20. A cured heat-stabilized resin according to claim 5, where said soap is selected from the group consisting of calcium 2-ethyl-hexanoate, calcium octoate, calcium laurate, calcium myristate, calcium stearate, calcium palmitate, calcium oleate, magnesium stearate, magnesium octoate, magnesium oleate, zinc stearate, zinc oleate, zinc laurate, cadmium stearate and mixtures thereof and where said peroxide is selected from the group consisting of dicumyl peroxide, ditertiary butyl peroxide, tertiarybutyl-cumyl peroxide, ditertiaryamyl peroxide and tertiaryaryamyl-cumyl peroxide.

21. A cured heat-stabilized resin according to claim 20, where said ester compound is selected from the group consisting of O,O-diethyl-S-phenacylphosphorodithioate and O,O-diethyl-S-o, m or p-chlorophenacyphosphorodithioate.

22. A cured heat-stabilized resin according to claim 20, said ester compound is selected from the grooup consisting of O,O-diethyl-S-benzylphosphorodithioate, O,O-diethyl-S-allylphosphorodithioate and O,O-di-n-hexyl-S-benzylphosphorodithioate.

23. A cured heat-stabilized resin according to claim 21, where said ester compound ranges from 0.9 to about 3.5 parts.

24. A cured heat-stabilized resin according to claim 22, where said ester compound ranges from 0.9 to about 3.5 parts.

25. A process according to claim 11, wherein said ester compound is selected from the class consisting of O,O-diethyl-S-benzylphosphorodithioate, O,O-diethyl-S-allylphosphorodithioate and O,O-di-n-hexyl-S-benzylphosphorodithioate.

26. A process according to claim 11, where said soap is selected from the group consisting of calcium 2-ethyl-hexanoate, calcium octoate, calcium laurate, calcium myristate, calcium stearate, calcium palmitate, calcium oleate, magnesium stearate, magnesium octoate, magnesium oleate, zinc stearate, zinc oleate, zinc laurate, cadmium stearate and mixtures thereof and where said peroxide is selected from the group consisting of dicumyl peroxide, ditertiary butyl peroxide, tertiarybutyl-cumyl peroxide, ditertiaryamyl peroxide and tertiaryaryamyl-cumyl peroxide.

27. A process according to claim 26, where said ester compound is selected from the group consisting of O,O-diethyl-S-phenacylphosphorodithioate and O,O-diethyl-S-o, m or p-chlorophenacylphosphorodithioate.

28. A process according to claim 26, where said ester compound is selected from the group consisting of O,O-diethyl-S-benzylphosphorodithioate, O,O-diethyl-S-allylphosphorodithioate and O,O-di-m-hexyl-S-benzylphosphorodithioate.

29. A process according to claim 27, where said ester compound ranges from 0.9 to about 3.5 parts.

30. A process according to claim 28, where said ester compound ranges from 0.9 to about 3.5 parts.

31. A composition according to claim 17, where said ester compound is selected from the group consisting of O,O-diethyl-S-benzylphosphorodithioate, O,O-diethyl-S-allylphosphorodithioate and O,O-di-n-hexyl-S-benzylphosphorodithioate.

32. A composition according to claim 17, where said soap is selected from the group consisting of calcium 2-ethyl-hexanoate, calcium octoate, calcium laurate, calcium myristate, calcium stearate, calcium palmitate, calcium oleate, magnesium stearate, magnesium octoate, magnesium oleate, zinc stearate, zinc oleate, zinc laurate, cadmium stearate and mixtures thereof and where said peroxide is selected from the group consisting of dicumyl peroxide, ditertiary butyl peroxide, tertiarybutyl-cumyl peroxide, ditertiaryamyl peroxide and tertiaryaryamyl-cumyl peroxide.

33. A composition according to claim 32, where said ester compound is selected from the group consisting of O,O-diethyl-S-phenacylphosphorodithioate and O,O-diethyl-S-o, m or p-chlorophenacylphosphorodithioate.

34. A composition according to claim 32, where said ester compound is selected from the group consisting of O,O-diethyl-S-benzylphosphorodithioate, O,O-diethyl-S-allylphosphorodithioate and O,O-di-n-hexyl-S-benzylphosphorodithioate.

35. A composition according to claim 33, where said ester ranges from 0.9 to about 3.5 parts.

36. A composition according to claim 34, where said ester ranges from 0.9 to about 3.5 parts.

* * * * *